United States Patent [19]

Morimoto et al.

[11] Patent Number: 5,014,253
[45] Date of Patent: May 7, 1991

[54] OPTICAL PICK-UP FOR SELECTIVE PLAYBACK AND RECORDING ON A MAGNETO-OPTICALLY RECORDED MEDIUM

[75] Inventors: Yasuaki Morimoto; Friedheim Zucker; Christian Büchler, all of Villingen-Schwenningen, Fed. Rep. of Germany

[73] Assignee: Deutsche Thomson-Brandt GmbH, Villingen, Fed. Rep. of Germany

[21] Appl. No.: 250,777

[22] Filed: Sep. 28, 1988

[30] Foreign Application Priority Data

Sep. 30, 1987 [DE] Fed. Rep. of Germany ....... 3732874

[51] Int. Cl.$^5$ ............... G11B 13/04; G11B 11/10; G11B 11/12
[52] U.S. Cl. .................................... 369/13; 369/116; 369/121; 369/122
[58] Field of Search ............... 369/13, 116, 121, 122, 369/110, 44, 45; 360/59, 114; 365/122; 250/201 DF

[56] References Cited

U.S. PATENT DOCUMENTS

| 4,283,785 | 8/1981 | Miyauchi et al. | 369/121 |
| 4,410,277 | 10/1983 | Yamamoto et al. | 365/122 |
| 4,779,250 | 10/1988 | Kogure et al. | 365/122 |

Primary Examiner—Stuart S. Levy
Assistant Examiner—Hoa Nguyen
Attorney, Agent, or Firm—Max Fogiel

[57] ABSTRACT

An optical pick-up for selective playback and recording on a magneto-optically recording medium, in which light is projected from a source onto the medium. The light is provided with a direction of a polarization, and is either reflected from the recording medium or is transmitted through the medium. The reflected or transmitted light becomes deflected onto a predetermined one of several photodetectors, depending on the direction of polarization of the light. The intensity of the reflected light or the transmitted light is held constant to minimize noise components that result from the optical properties of different recorded media as well as from the light. By holding the light intensity constant, moreover, precise readjustment to each of the different recording media that may be used, is not necessary.

3 Claims, 3 Drawing Sheets

OPTICAL PICK-UP FOR SELECTIVE PLAYBACK AND RECORDING ON A MAGNETO-OPTICALLY RECORDED MEDIUM

BACKGROUND OF THE INVENTION

The invention concerns an optical pick-up for reading and/or writing a magneto-optically recording medium, whereby a source of light projects light onto the recorded medium and the light reflected by the medium or penetrating through it is deflected onto one photodetector or another in accordance with the direction of polarization of the light. An optico-magnetic recorded medium, also called a magneto-optic disk, is described in the article "Magnetooptische Versuche dauern an" magneto-optic experiments continue"]on pages 37 to 41 of Funkschau 13 (June 20, 1986).

A magneto-optic disk, in contrast to a conventional compact disk, has impressions. Behind the light-permeable layer is a magnetic layer that data can be recorded in and read out from. How data are written onto a magneto-optic disk will now be described. The magnetic layer is heated to above the Curie point by a laser beam focused on the disk. It is usually sufficient, however, to heat the magnetic layer to the compensation point, which is just below the Curie point. Behind the focal point on the disk is an electromagnet that magnetizes the area heated by the laser beam in the direction or the other. Since the heated area cools down to below the Curie point again once the laser beam is turned off, the direction of magnetization established by the electromagnet is preserved, "freezing in" in a manner of speaking. The individual bits are accordingly stored in domains of different directions of magnetization. One direction of magnetization for example corresponds to a domain of logical one and the other direction of magnetization to a logical zero.

The data are read out by exploiting the Kerr effect. The plane of polarization of a linearly polarized beam of light is rotated by a measurable angle when the light is reflected by a magnetized mirror. Depending on the direction that the mirror is magnetized in, the plane of polarization of the reflected beam is rotated to the right or to the left. Since, however, the individual domains on the disk act like magnetized mirrors, the plane of polarization of a scanning beam of light will be rotated at a small but still measurable angle to the right or left in accordance with the direction of magnetization of the domain just scanned.

The Faraday effect, which is similar to the Kerr effect, is exploited with magneto-optic disks through which the beam of light is transmitted. The optical pick-up determines from the rotation of the plane of polarization of the light reflected by the disk or transmitted through the disk whether the bit it is sensing is a logical one or a logical zero.

In known optical pick-ups, the light is deflected by a polarizing beam divider onto one of two photodetectors in accordance with its direction of polarization, and a data signal is derived from the difference between the signals from the two detectors.

To ensure that the polarizing beam divider will symmetrically separate light with a plane of polarization that is not rotated due to the Kerr effect or Faraday effect, meaning that each photodetector will receive the same light energy, the divider must be adjusted such that the angle between the unrotated plane of polarization and one lateral edge of the divider is 45°. When the plane of polarization of the light has been rotated in one direction as a result of the Kerr effect or Faraday effect, one photodetector will receive the same light energy as the other if the plane of polarization of the light is rotated at the same angle in the other direction.

This situation will now be explained with reference to FIG. 1, which is a vector diagram.

FIG. 1 illustrates the polarization vector V1 of light with a plane of polarization that has been rotated in one direction as the result of the Kerr effect or Faraday effect. The V2 in FIG. 1 is the polarization vector of the light with a plane of polarization rotated in the other direction. I1 and I2 are the vector components that parallel the edges of the polarizing beam divider.

The divider is correctly positioned in the path of the beam when both vectors are symmetrical to the angle bisector V' which is the vector of polarization of the light with the plane of polarization that is not rotated. The Kerr effect or Faraday effect will rotate the plane of polarization of the light out of its midposition V by an angle of either $+\phi$ or $-\phi$.

Why the angle between the edges of the polarizing beam divider and the unrotated plane of polarization must be as precisely 45° as possible will now be explained with reference to the following formula. S(t) represents disruptive noise components resulting from the optical properties of the magneto-optic recording medium and from laser noise. The magneto-optic signal MS is obtained from the formula $$\begin{aligned} MS &= \pm V \cdot [1 + S(t)] \cdot [\cos(\alpha + \phi) - \sin(\alpha + \phi)] \\ &= \pm V \cdot [1 + S(t)] \cdot \sqrt{2} \sin(45° - \alpha + \phi) \\ &= \pm \sqrt{2V} \cdot [1 + S(t)] \cdot [\sin(45° - \alpha) \cdot \cos\phi \pm \cos(45° - \alpha) \cdot \sin\phi] \end{aligned}$$

Since the plane of polarization is not rotated very far at the angle of $+\phi$ or $-\phi$ as a result of the Kerr effect or Faraday effect, $\cos\phi$ is approximately 1. If the polarizing beam divider is positioned in the path of the beam such that angle $\alpha$ is precisely 45°, disturbance component $S(t) \cdot \sin(45°) \cdot \cos\phi$ will cancel out because the term $\sin(45° - \alpha)$ is zero.

Since, however, magneto-optic disks are made out of different materials with different optical properties, different double refractions for example, the prism beam divider can be optimally adjusted for only one type of disk. The disruptive component $S(t) \cdot \sin(45° - \alpha) \cos\phi$ is not zero in magneto-optic disks with a different double refraction. To keep this component constantly suppressed, the beam divider must be readjusted for each type of disk.

SUMMARY OF THE INVENTION

Since this approach is very expensive, the object of the invention is to provide an optical pick-up wherein the noise components of the magneto-optic signal will be continuously minimized in magneto-optic recording media of differing optical properties without having to constantly readjust the prism beam divider.

This object is attained in accordance with the invention in that the intensity of the light that is reflected by or is transmitted through the recorded medium is maintained at a constant level.

DESCRIPTION OF THE PREFERRED EMBODIMENTS

Since the intensity of the light that is reflected by or is transmitted through the recording medium is maintained at a constant level, disturbance component S(t) will be zero. The magneto-optically recorded medium in accordance with the invention can accordingly read magneto-optic disks with different optical properties and without the prism beam divider having to be readjusted when a ne disk is inserted. Furthermore, the prism beam divider no longer has to be as precisely adjusted as at the state of the art because the disturbance components S(t) are eliminated in accordance with the invention.

Figure 1:
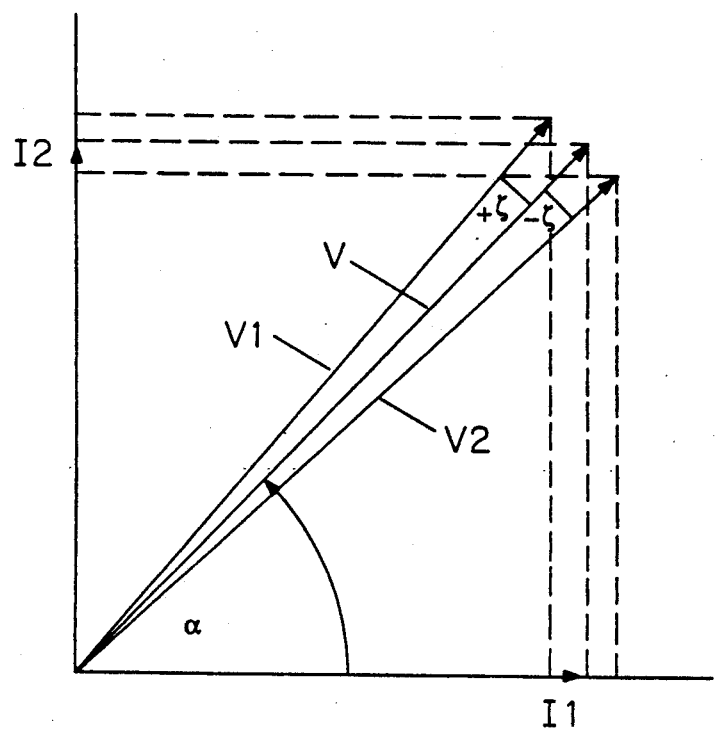
FIG. 1 illustrates angles of rotation of the plane of polarization flight due to Kerr and Faraday effects.
Figure 4:
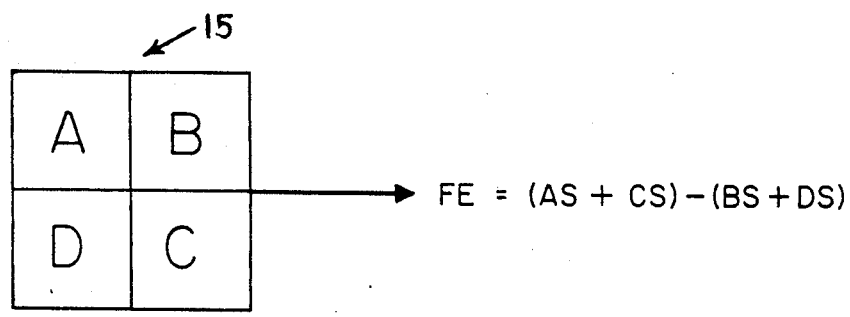
Figure 5:
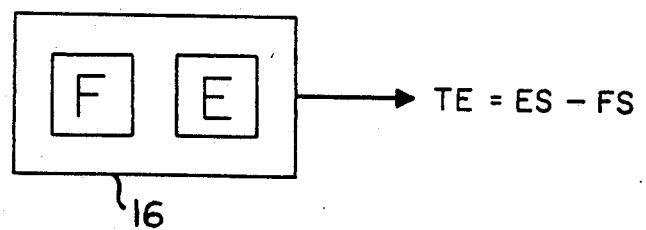
Figure 2:
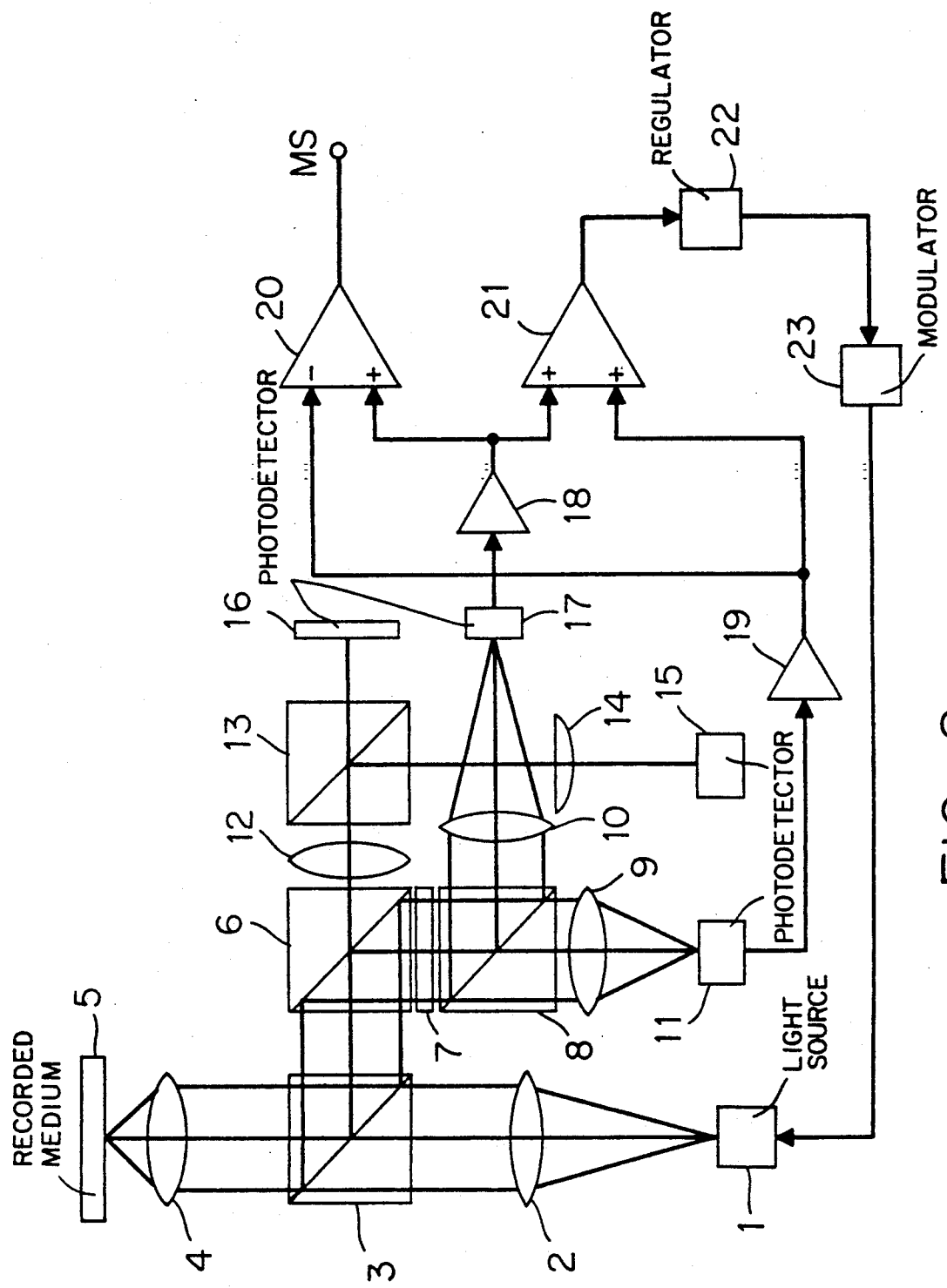
FIG. 2 illustrates one embodiment.

The beam of light that scans the data in the embodiment illustrated in FIG. 2 is derived from a source 1 of light, usually a laser, and is focused by a lens 2, a prism beam divider 3, and a lens 4 onto a recording medium 5, which reflects the beam back to prism beam divider 3 through lens 4. Prism beam divider 3 deflects the reflected beam at a right angle onto a prism beam divider 6. The beam of light that travels straight through prism beam divider 6 passes through a lens 12 and strikes a prism beam divider 13 that deflects a beam of light onto a photodetector 16, which can consist for example of two photodiodes E and F. A tracking error signal TE=ES−FS is constructed in a differential amplifier from the output signals ES and FS of the photodiodes as occurs in a what is called a "three-beam optical pickup." Prism beam divider 13, however, also deflects a beam of light at a right angle through a lens 14 onto a photodetector 15, which can for example consist of four square photodiodes A, B, C, and D. A focusing error signal FE=(AS+CS)−(BS+DS) is constructed as is conventional with three-beam optical pick-ups out of the output signals from the four photodiodes.

Prism beam divider 6, however, also deflects a beam of light at a right angle through a $\mu/2$ plate 7 onto a polarizing beam divider 8. Polarizing beam divider 8 deflects the beam of light through a lens 9 onto a photodetector 11 if the plane of polarization of the beam is rotated in one direction and through a lens 10 onto another photodetector 17 if its plane of polarization is rotated in the other direction. The photovoltage from first photodetector 11 is forwarded by way of an amplifier 19 to the first input terminal of a summation amplifier 21 and to the subtraction input terminal of a differential amplifier 20. The photovoltage from second photodetector 17 is forwarded by way of an amplifier 18 to the second input terminal of summation amplifier 21 and to the addition input terminal of differential amplifier 20. The output terminal of summation amplifier 21 is connected by way of a regulator 22 to the input terminal of a modulator 23 that controls the light output of laser 1 such that the intensity of the light reflected by the recording medium is maintained at a constant level.

The intensity of the light reflected by recording medium 5 can also be maintained at a constant level, however, by forwarding the output signal from photodetector 15 or 16 to the input terminal of regulator 22. There can also be another photodetector that receives the light reflected by recording medium 5 and emits an output signal that regulates the intensity of the light.

Figure 3:
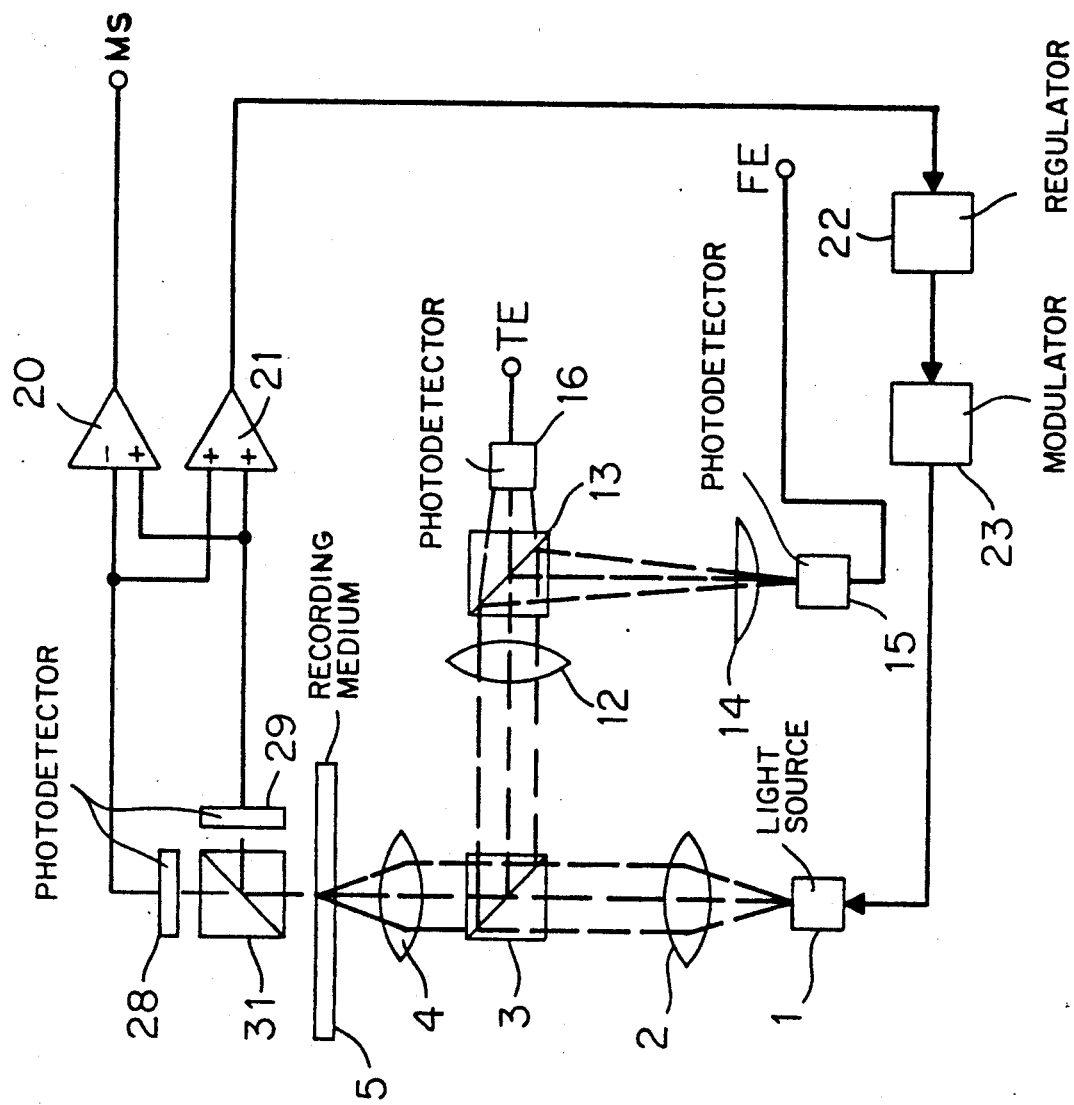
FIG. 3 another embodiment of the invention.

In the embodiment illustrated in FIG. 3, the beam of light generated by a laser 1 travels through a lens 2, a prism beam divider 3, and a lens 4 to recorded medium 5. Some of the light emitted by laser 1 is reflected back through lens 4 to prism beam divider 3, which deflects a beam of light through a lens 12 and a prism beam divider 13 to a photodetector 16, from the output signals of which the tracking error signal TE for the tracking circuit is generated. Prism beam divider 13, however, also deflects a beam of light through a lens 14 onto a photodetector 15, which can for example be a four-square detector consisting of four square photodiodes A, B, C, and D. The focusing error signal for the focusing circuit is obtained from the output signals from photodetector 15. Behind recording medium 5 is a polarizing beam divider 31 that deflects the beam of light with a plane of polarization that is rotated in one direction onto a photodetector 28 and the beam of light with a plane of polarization that is rotated in the other direction onto a photodetector 29. Photodetectors 28 and 29 are connected to the input terminals of a differential amplifier 20.

Polarizing beam divider 31 causes more light to strike either photodetector 28 or photodetector 29, depending on what direction the individual magnetic domains in recorded medium 5 are magnetized in. A data signal MS that contains the data stored in the magnetic domains can accordingly be obtained from the output terminal of differential amplifier 20.

Photodetectors 27 and 28 are connected to the input terminals of a summation amplifier 21, the output terminal of which is connected to the input terminal of a regulator 22. The output terminal of the regulator is connected to the input terminal of a modulator 23, the output terminal of which is connected to the control input terminal of laser 1. The intensity of the light that is transmitted through recording medium 5 is maintained at a constant level by modulator 23.

The summation amplifier can be replaced with a photodetector that receives the light transmitted through the recorded medium and has an output terminal that is connected to the input terminal of regulator 22.

We claim:

1. An optical pick-up for selective playback and recording on a magneto-optically re-recording medium, comprising: a source of light for projecting light onto said re-recording medium, said light having a direction of polarization; first and second photodetectors; said light being reflected from said re-recording medium; a polarizing beam divider for deflecting the reflected light onto a predetermined one of said first and second photodetectors depending on the direction of polarization of the light, said reflected light having an intensity, said reflected light having different noise components for different re-recording media due to different optical properties of different re-recording media and due to variations of said light, different re-recording media with different noise components requiring different adjustments of said deflecting means due to said different noise components when said different re-recording media are used with said optical pick-up; and means for holding the intensity of said reflected light constant to substantially minimize said different noise components in said reflected light without requiring precise readjustment of said deflecting means to each of the different re-recording media; said holding means comprising: a first lens, a first prism beam divider, and a second lens, light from said source of light being focused onto said re-recording medium through said first lens, said first prism beam divider, and said second lens, said reflected light travelling back through said second lens and to said first prism beam divider; a second prism beam divider, a third lens, and a third prism beam divider, as well as a third photodetector, said second prism beam divider receiving deflected light from said first prism beam divider and deflecting the received light onto said third photodetector through said third lens and said third prism beam divider; said third photodetector having an output signal for generating a tracking error signal for a tracking circuit; a fourth lens and a fourth photodetector, said third prism beam divider receiving a beam of light from said second prism beam divider through said third lens and deflecting the received beam of light onto said fourth photodetector through said fourth lens; said fourth photodetector having an output signal for generating a focusing error signal for a focusing circuit; a half-wavelength plate, and a fifth lens, said second prism beam divider deflecting a beam of light received from said first prism beam divider onto said first photodetector through said plate, said polarizing beam divider, and said fifth lens; said polarizing beam divider deflecting a beam of light received from said second prism beam divider onto said second photodetector; a first amplifier, a summation amplifier having an input, and a differential amplifier having a subtraction input, said first photodetector having an output connected through said first amplifier to said input of said summation amplifier and to said subtraction input of said differential amplifier; a second amplifier, said second photodetector having an output connected through said second amplifier too a second input of said summation amplifier and to an adding input of said differential amplifier; a regulator connected to a modulator, said summation amplifier having an output connected through said regulator to an input of said modulator; said modulator having an output connected to a control input of said source of light; said differential amplifier having an output corresponding to a data signal containing data stored in magnetic domains of said re-recording medium.

2. An optical pick-up for selective playback and recording on a magneto-optically re-recording medium, comprising: a source of light for projecting light onto said re-recording medium, said light having a direction of polarization; first and second photodetectors; said light being transmitted through said re-recording medium; a polarizing beam divider for deflecting the transmitted light onto a predetermined one of said first and second photodetectors depending on the direction of polarization of the light, said transmitted light having an intensity, said transmitted light having different noise components for different re-recording media due to different optical properties of different re-recording media and due to variations of said light, different re-recording media with different noise components requiring different adjustments of said deflecting means due to said different noise components when said different re-recording media are used with said optical pick-up; and means for holding the intensity of said transmitted light constant to substantially minimize said different noise components in said transmitted light without requiring precise readjustment of said deflecting means to each of the different re-recording media; said holding means comprising: a first lens, a first prism beam divider, and a second lens, light from said source of light travelling to ne side of said re-recording medium through said first lens, said first prism beam divider, and said second lens; said polarizing beam divider being located on a side of re-recording medium that is opposite to said one side; a reflected light from the medium travelling through said second lens to said first prism beam divider; a third lens, and a second prism beam divider, light from said first prism beam divider being deflected through said third lens to said second prism beam divider; a fourth lens, and a third photodetector, said second prism beam divider deflecting light received from said first prism beam divider onto said third photodetector through said fourth lens; said third photodetector having an output signal for generating a focusing error signal for a focusing circuit; a fourth photodetector, sad second prism beam divider deflecting also light received from said first prism beam divider onto said fourth photodetector; said fourth photodetector having an output signal for generating a tracking error for a tracking circuit; a summation amplifier connected to said first and second photodetectors for generating a sum of output photo voltages of said first and second photodetectors; a regulator connected to a modulator, said summation amplifier having an output connected through said regulator to said modulator, said modulator being connected to said source of light and regulating light from said source of light so that the intensity of the light transmitted through said re-recording medium to said polarizing beam divider is maintained at a substantially constant level and means connected to said summation amplifier and one of said photodetectors for generating a data signal containing data stored in magnetic domains of said re-recording medium.

3. An optical pick-up for selective playback and recording on a magneto-optically re-recording medium, comprising: a source of light for projecting light onto said re-recording medium, said light having a direction of polarization; first and second photodetectors, said light being transmitted through said re-recording medium; means for deflecting the transmitted light onto a predetermined one of said first and second photodetectors depending on the direction of polarization of the light, said transmitted light having an intensity, said transmitted light having different noise components for different re-recording media due to different optical properties of different re-recording media and due to variations of said light, different re-recording media with different noise components requiring different adjustments of said deflecting means due to said different noise components when said different re-recording media are used with said optical pick-up; and means for holding the intensity of said transmitted light constant to substantially minimize said different noise components in said transmitted light without requiring precise readjustment of said deflecting means to each of the different re-recording media; said holding means comprising: a first lens, a first prism beam divider, and a second lens, light from said source of light traveling to one side of said re-recording medium through said first lens, said first prism beam divider, and said second lens; said deflecting means comprising a polarizing beam divider located on a side of re-recording medium that is opposite to said one side; a reflected light passing through said second lens to said first prism beam divider; a third lens, and a second prism beam divider, light from said first prism beam divider being deflected through said third lens to said second prism beam divider; a fourth lens, and a third photodetector, said second prism beam divider deflecting light received from said first prism beam divider onto said third photodetector through said fourth lens; said third photodetector having an output signal for generating a focusing error signal for a focusing circuit; a fourth photodetector, said second prism beam divider deflecting also light received through from said first prism beam divider onto said fourth photodetector; said fourth photodetector having an output signal for generating a tracking error for a tracking circuit; a summation amplifier connected to said first and second photodetectors for generating a sum of output photo voltages of said first and second photodetectors; a regulator connected to a modulator, said summation amplifier having an output connected through said regulator to said modulator, said modulator regulating light from said source of light so that the intensity of the light transmitted through said re-recording medium is maintained at a substantially constant level.

* * * * *